(12) United States Patent
Fiedler et al.

(10) Patent No.: US 8,460,454 B2
(45) Date of Patent: Jun. 11, 2013

(54) ALKYL SILICATE PAINT COMPOSITIONS WITH IMPROVED CRACKING RESISTANCE

(75) Inventors: Helle Fiedler, Virum (DK); Vibeke Stendal Larsen, Allerød (DK); Linda Nysteen, Virum (DK)

(73) Assignee: Hempel A/S, Lyngby (DK)

( * ) Notice: Subject to any disclaimer, the term of this patent is extended or adjusted under 35 U.S.C. 154(b) by 85 days.

(21) Appl. No.: 12/747,168

(22) PCT Filed: Dec. 9, 2008

(86) PCT No.: PCT/EP2008/067102
§ 371 (c)(1),
(2), (4) Date: Oct. 21, 2010

(87) PCT Pub. No.: WO2009/074570
PCT Pub. Date: Jun. 18, 2009

(65) Prior Publication Data
US 2011/0061568 A1 Mar. 17, 2011

(30) Foreign Application Priority Data
Dec. 10, 2007 (EP) .................................... 07023873

(51) Int. Cl.
*C09D 183/02* (2006.01)
*C09D 7/00* (2006.01)

(52) U.S. Cl.
USPC ..................................... 106/287.13; 524/588

(58) Field of Classification Search
USPC ..................................... 106/287.13; 524/588
IPC ............................................. C09D 183/02,7/00
See application file for complete search history.

(56) References Cited

U.S. PATENT DOCUMENTS 3,056,684 A * 10/1962 Lopata et al. .............. 106/14.36
3,382,083 A * 5/1968 Marsden et al. ............... 106/711
5,932,500 A * 8/1999 Jensen et al. .................... 501/36

FOREIGN PATENT DOCUMENTS

| GB | 1390270 A | | 4/1975 |
| JP | 57173690 | * | 4/1982 |
| WO | WO-9614274 A2 | | 5/1996 |
| WO | WO-9614454 A2 | | 5/1996 |
| WO | WO-2007077130 A1 | | 7/2007 |

OTHER PUBLICATIONS

Machine translatin of Watanabe (JP05-057242).*
Steinmetz, James R. et al., The Use of Ethyl Silicate in Zinc Rich Paints, Modern Paint and Coatings, pp. 48-49 (1983).
Sax, N. Irving et al., Hawley's Condensed Chemical Dictionary, 11th Edition, p. 521, Definition of Filler (1), (1987).

* cited by examiner

*Primary Examiner* — Jun Li
(74) *Attorney, Agent, or Firm* — Birch, Stewart, Kolasch & Birch, LLP

(57) ABSTRACT

The present application discloses an acidic-stabilized alkyl silicate composition comprising 0.5-30% by solids volume of inorganic fibers, wherein the fibers have (i) an average length of 25-250 μm and an average thickness of 1-50 μm, and a ratio between the average length and the average thickness (aspect ratio) of at least 5; and (ii) a specific surface area (BET) of 0.01-6 $m^2/g$. A corresponding acidic-stabilized alkyl silicate composition comprising zinc and inorganic fibers, wherein the zinc constitutes 50-95% by solids weight of the total composition, and the fibers constitutes 0.5-30% by solids volume of the non-zinc fraction of the composition, is also disclosed. The application further discloses a method for the establishment of a crack resistant alkyl silicate paint coat by applying one of the compositions to a metal surface.

16 Claims, No Drawings

ALKYL SILICATE PAINT COMPOSITIONS WITH IMPROVED CRACKING RESISTANCE

This Application is in the National Phase Under 35 U.S.C. §371 of PCT International Application No. PCT/EP2008/067102 filed on Dec. 9, 2008, which claims priority on European Application No. EP07023873.8 filed on Dec. 10, 2007. The entire contents of which are hereby incorporated by reference.

FIELD OF THE INVENTION

The present invention relates to an acidic-stabilised alkyl silicate composition with improved cracking resistance. The present invention provides improved cracking resistance of such an acidic-stabilised alkyl silicate composition by incorporation of specific types of fibres.

BACKGROUND OF THE INVENTION

Alkyl silicate coatings are used mainly as anti-corrosive primers on steel substrates due to outstanding corrosion resistance, superior mechanical properties, very high temperature resistance and excellent chemical resistance.

Alkyl silicate coating compositions are typically one or two-component products. If the product is two-component, component one normally consists of a liquid mixture of the silicate binder, co-binders, anti-sagging agents and solvents and component two contains a metallic pigment, most often a metallic zinc pigment commonly referred to as zinc dust.

Zinc silicates are superior to other linings concerning anti-corrosive properties due to its function as a sacrificial anode applied directly on top of the clean steel surface. When the coating layer is damaged the zinc will protect the damage by galvanic protection. The function is similar to that of galvanized steel.

Alkyl silicate binders are normally used as primer, i.e. first coating layer in a multiple coat system with subsequent layers of suitable generic types of coatings e.g. epoxy or polyurethane. However, silicate binders can also be used as one-coat systems or alternatively as topcoats Alkyl silicates such as ethyl silicates are not reactive enough to be suitable for binder use without further hydrolysis. The hydrolysis of ethyl silicate can be either acid or base catalyzed. Acid catalysis generally proceeds in a somewhat slower and more controlled fashion. In addition, the presence of acids tends to stabilize reactive silanol (Si—OH) groups and increase storage stability. An overview of the issues of stability and reactivity for ethyl silicates is given in "The Use of Ethyl Silicate in Zinc Rich Paints", Steinmetz J. R., *Modern Paint and Coatings*, June 1983. If alkaline materials are introduced in the liquid part of an acidic-stabilised silicate binder, the liquid becomes neutral and the silanol groups become reactive and an instable liquid is formed.

It is well known to the person skilled in the art that depending on the type of acidic-stabilised alkyl silicate binder and alkaline material introduced into the silicate binder, the stability in the liquid part could vary from no more than 6 months stability to almost immediate gelling of the product.

Examples of alkaline materials are fillers such as feldspar, talc, mica, dolomite, calcite, bauxite, or various types of silicate materials.

In practise, the person skilled in the art will refrain from introducing alkaline materials in to the composition in order to secure storage stability. The person skilled in the art will select ingredients among materials giving a pH in the neutral area or a pH below 7 when suspended or dissolved in water.

Acidic stabilised alkyl silicate coatings are easy to apply with standard spraying equipment. However, spraying a silicate paint composition is a little different from conventional paints. Normally, paints have a tendency to build up in corners on welding seams and in difficult accessible areas, a problem which is even more pronounced if the silicate paint composition contains a metallic pigment e.g. zinc. These products are formulated with PVC above the CPVC ratio to ensure sufficient contact between the zinc particles for galvanic protection. Silicate coatings with metallic pigment will therefore have a higher risk for mud cracking if they are applied in too high film thickness. Consequently, extra efforts and man hours are often spent here in order not to end up with too high dry film thicknesses.

Existing silicate products are specified in a total dry film thickness of 40 to 125 µm, typically 75 µm, but it is unavoidable to get overlaps and high dry film thickness in corners and edges. Especially in association with the interior of the angles formed between the structural elements there is a risk of getting far higher dry film thicknesses than specified. Often it is necessary to go after with brushes on the critical areas in order to avoid mud-cracking. Removing excess paint manually by brush is time consuming and not the ideal solution but the alternative is worse: Too high coating thickness, often exceeding normal acceptance limits, causes high curing shrinkage stress and may cause mud-cracking.

When the silicate paint composition is applied in too high film thickness, mud cracking appears. This happens when the narrowly defined correlation between the applied film thickness, the drying process, and the curing is "out of balance".

In the past asbestos fibres and fibrous calcium silicate have been used in zinc alkyl silicate compositions (U.S. Pat. No. 3,056,684).

In recent years faster curing products have appeared comprising accelerators such as zinc chloride or magnesium chloride. Fast curing lowers the overall processing time which has become a very important parameter for paint applicators and contractors. However it has only been possible to increase curing up to a certain level as the fast curing has a negative impact on the cracking level (internal stress). The amount of zinc chloride that can be added is therefore limited.

The curing process starts on the surface of the coating. When curing is too fast the soft uncured part of the coating will not have sufficient strength to "carry" the stress built up during curing and mud cracks will develop on the surface leading to subsequent loss of adhesion, cohesion and corrosion problems There is a need for a storage stable, acid catalysed alkyl silicate with increased flexibility, enabling faster processing without mud cracking.

It has now surprisingly been discovered that it is possible to incorporate substantial amounts of alkaline fibres into acidic-stabilised alkyl silicate composition without any stability problems.

SUMMARY OF THE INVENTION

The present invention provides a storage stable, acidic-stabilised alkyl silicate composition with increased flexibility, enabling faster processing without mud cracking.

This being said, the present invention provides an acidic-stabilised alkyl silicate composition comprising 0.5-30% by solids volume of inorganic fibres,
said fibres having
 (i) an average length of 25-250 µm and an average thickness of 1-50 µm, and a ratio between the average length and the average thickness (aspect ratio) of at least 5; and
 (ii) a specific surface area (BET) of 0.01-6 m$^2$/g.

The present invention further provides an acidic-stabilised alkyl silicate composition comprising zinc and inorganic fibres, the zinc constituting 50-95% by solids weight of the total composition, and the fibres constituting 1-30% by solids volume of the non-zinc fraction of the composition,
said fibres having
  (i) an average length of 25-250 μm and an average thickness of 1-50 μm, and a ratio between the average length and the average thickness (aspect ratio) of at least 5; and
  (ii) a specific surface area (BET) of 0.01-6 m²/g.

Moreover, the present invention provides a method for the establishment of a crack resistant alkyl silicate paint coat, said method comprising the step of applying a paint composition as defined herein to a metal surface.

DETAILED DESCRIPTION OF THE INVENTION

As mentioned above, the present invention—in a first main aspect—provides an acidic-stabilised alkyl silicate composition comprising 0.5-30% by solids volume of inorganic fibres, said fibres having
  (i) an average length of 25-250 μm and an average thickness of 1-50 μm, and a ratio between the average length and the average thickness (aspect ratio) of at least 5; and
  (ii) a specific surface area (BET) of 0.01-6 m²/g.

It has been found that by applying the principles of the present invention, the narrow correlation between mud cracking level and dry film thickness for an alkyl silicate coating can actually become very wide by incorporating fibres.

Fibres will when incorporated in the alkyl silicate resin matrix increase the ability to withstand higher mechanical stress. This facilitates the possibility to formulate alkyl silicate compositions with faster curing and higher mud crack resistance at the same time.

It should be understood that in one main embodiment, the alkyl silicate composition may be used as a component of a two-component system (or a system comprising more than two components), e.g. where another component may contain zinc (see further below). In a second main embodiment, the alkyl silicate composition may be used as a coating composition in its own right, e.g. without the inclusion zinc.

Alkyl Silicate

The term "alkyl silicate composition" should be construed as the combination of—as the principal constituents—one or more alkyl silicate resins, any catalysts and any accelerators, and in addition hereto, in the context of the present invention, fibres. The compositions may further included other constituents, e.g., as it will be explained further below.

The term "acidic-stabilised" is intended to mean that the silicate is partially hydrolysed by means of water and by utilizing an acid (e.g. hydrochloric acid, sulphuric acid) as a catalyst. Acid catalysis generally proceeds in a somewhat slower and more controlled fashion compared to partial hydrolysis by using a base as the catalyst. In addition, the presence of acids tends to stabilize reactive silanol (Si—OH) groups and increase storage stability. The compositions discussed herein are all "acidic-stabilised" for what reason they are simply referred to as "alkyl silicate compositions".

Besides the fact that the alkyl silicate composition should preferably facilitate fast curing, it is also relevant that the alkyl silicate coat resulting from the application of the alkyl silicate composition (either by direct application or after admixture with another component, e.g. a zinc-containing component) is somewhat flexible.

The alkyl silicate composition comprises one or more alkyl silicate resins. Suitable alkyl silicate resins include ethyl silicates although other alkyl silicates, wherein the alkyl groups contained from 1 to 8 carbon atoms, such as methyl silicates, propyl silicates, butyl silicates, hexyl silicates and octyl silicates can also be employed, either alone or in admixture. The alkyl silicate resins used can suitably be hydrolysed to various degrees.

Examples of suitable commercially available alkyl silicate resins are:
Dynasylan 40, ex. Degussa (Germany), ethyl silicate
Silikat TES 40 WN, ex. Wacker Chemie (Germany), ethyl silicate
Silbond 40, ex. Silbond Corporation (USA), ethyl silicate
Silikat TES 28, ex. Wacker Chemie (Germany), ethyl silicate Ethyl silicate has been the dominant alkyl silicate resin for more than 30 years. Other alkyl types have been used such as isopropyl and butyl from which the corresponding alcohol is evolved on hydrolysis, but ethyl, despite of the low flash point of 10° C. of ethanol, is the principal type used. Ethanol is completely miscible with water, ideal for hydrolysis and has low toxicity (G. J. Biddle, Inorganic zinc silicate coatings). Moreover, curing speed is faster than with higher alcohols.

The starting point for ethyl silicate (relevant illustrative example of an alkyl silicate) is tetra ethyl ortho silicate (TEOS), a monomeric product with a composition of $(C_2H_5O)_4Si$. The raw material normally used by paint manufacturers is a polyethyl silicate containing about 40% silica. Normal procedure is to partially hydrolyse the polyethyl silicate during production by addition of water and a small amount of catalyst, e.g. hydrochloric acid to speed up the curing of the coating after application. Upon partial hydrolysis, some of the ethoxy groups in the ethyl ortho silicate are replaced by hydroxyl groups, thereby liberating ethanol. Some of the hydroxyl groups react with each other, giving off water and tying silicon atoms together by oxygen bridges. The condensation reaction is slow in acidic environments. The amounts of water and catalyst are carefully calculated and controlled to optimise the balance between shelf life, mixed pot life, curing and cracking level.

Preferably, the degree of pre-hydrolysis of the alkyl silicate resin is more than 50%, such as 60-95%, e.g. 75-90%.

If the alkyl silicate composition is mixed with zinc (see also further below), the resulting paint composition becomes pH-neutral. The condensation reaction will become active and the alkyl resin silicate will begin to polymerize. After application, humidity in the air completes the polymerisation A common way to reduce the curing time is to add an accelerator such as zinc chloride or magnesium chloride. The maximum amount of zinc chloride that can be added is limited as the fast curing has a negative impact on the cracking level (internal stress). By adding fibres to the alkyl silicate resin, the negative impact on the cracking level can be diminished and it is possible to add higher amounts of accelerator thereby reducing the curing time even further than previously possible.

If an alkyl silicate resin is not fully cured, its abrasion resistance and the adhesion to subsequent paint layers are reduced.

The alkyl silicate composition comprises one or more catalysts. Suitable catalysts are believed to include hydrochloric acid and sulphuric acid.

The alkyl silicate composition may further comprise one or more accelerators selected from zinc chloride, magnesium chloride or borate types like trimethylborate.

Examples of suitable commercially available accelerators are:
Zinc Chloride, ex. Barcelonesa de Droguas y Producto Químicos (Spain), anhydrous zinc chloride Magnesium chloride (CAS no. 7786-30-3), ex Merck (Germany), anhydrous magnesium chloride
Silbond TMB 70, ex. Silbond Corporation (USA), trimethylborate.

The accelerators—when present—typically constitutes 0.1:100 to 50:100, e.g. 0.5:100 to 20:100, such as 1:100 to 10:100 or 2:100 to 6:100 relative to the alkyl silicate resin.

Inorganic Fibres

Another important constituent of the alkyl silicate composition is the inorganic fibres.

Inorganic fibres encompass natural inorganic fibres and synthetic inorganic fibres, in particular mineral fibres of these types, such as volcanic rock fibres, are especially preferred.

By "mineral fibres" should be understood fibres made using minerals as starting materials. According to this definition "mineral fibre" includes both crystalline materials and amorphous materials formed by a melting process.

It is presently believed that the fibres to be used within the present invention should fulfil certain criteria with respect to dimensions and surface characteristics in order to provide the improved properties of the resulting paint compositions. Thus, with respect to average length and average thickness of the fibres which are added to the paint during manufacture of the paint or mixed with the paint before application, such fibres have an average length of 25-250 µm and an average thickness of 1-50 µm, and a ratio between the average length and the average thickness (aspect ratio) of at least 5.

In the present invention preferred inorganic fibres are inorganic fibres having an average thickness of 1-25 µm and an average length of 25-250 µm, in particularly an average length of 50-250 µm (such as 50-170 µm) and an average thickness of 2-20 µm (such as 2-10 µm). The preferred inorganic fibres furthermore have a ratio between the average length and the average thickness (aspect ratio) of at least 5, preferably a ratio between the average length and the average thickness of at least 10, in particular at least 15, such as at least 20.

For the purpose of the manufacture, it is furthermore preferred that the length of the fibres are held within a certain threshold value, e.g. a maximum length of 500 µm, so that conventional spraying equipment can be used with only minor modifications. In particular, it is preferred that the maximum length of the fibres is at the most 400 µm, e.g. at the most 350 µm.

It should be noted that the term "length" refers to the greatest dimension of the fibre particle in question. The term "average" when used in connection with length indicates that a certain variation of the length of fibres exists within the distribution of the fibres used. The term "average thickness" also refers to the fibres in question, however with regard to the distribution of fibres also taking into account the longitudinal and cross-sectional variation with each individual fibre.

In order for a certain particle to be considered as a fibre within the present context, the ratio between the greatest dimension and the smallest dimension perpendicular to the length dimension in substantially all points along the longitudinal axis (the length dimension—longest dimension) should not exceed 2.5:1, preferably not exceed 2:1. Furthermore, the ratio between the longest dimension and the second smallest of the two shortest dimensions should be at least 2:1, preferably at least 5:1. Thus, fibres are characterised of having one long dimension and two short dimension, where the long dimension is longer than the two short dimensions (typically by an order of magnitude, or even more), and the two short dimensions are substantially equal (of the same order of magnitude). For completely regular fibres, i.e. fibres having a cylindrical shape, it is evident how to determine the "length" (longest dimension) and the two (identical) shortest dimensions. For more irregular fibres, it is believed that the relationship between the dimensions can be evaluated by the following hypothetical experiment: A regular, right-angled box is constructed around the fibre. The box is constructed so as to have the smallest possible volume as it should fully comprise the fibre. To the extent that the fibre is curved, it is (again hypothetically) assumed that the fibre is flexible so that the volume of the hypothetical box can be minimised by "straightening" the fibre. In order for the "fibre" to be recognised as so in the present context, the ratio between the two smallest dimensions of the box should be at the most 2.5:1 (preferably 2:1) and the ratio between the longest dimension of the box and the second smallest of the two smallest dimensions of the box should be at least 5:1.

The above is given as a general guideline in order to exclude other types of particles which may be referred to as "fibres" but which do have less satisfactory properties within the present invention. In particular, the term "fibre" is not intended to include so-called inorganic "fibre" materials which are used as fillers (e.g. frayed type fillers with no well defined dimensions such as asbestine (asbestine typically have a specific surface area (BET) of around 50 $m^2/g$)), cf. Hawley's Condensed Chemical Dictionary, $11^{th}$ Ed., (Sax and Lewis, eds.), Van Nostrand Reinhold Company, New York, 1987, page 521. Neither does "fibre" include flake type fillers, e.g. mica, flake shaped clay minerals, aluminium flakes nor glass flakes cf. the definition above. With respect to "curved" fibres, it should be understood that the length dimension should be considered as the length along the curve defined by the fibre.

Without being bound to any specific theory, it is also envisioned that the specific surface area (BET) of the fibre is important. The specific surface area of the fibres used is typically 0.01-6 $m^2/g$, such as 0.05-6 $m^2/g$, preferably 0.05-5 $m^2/g$, or 0.05-4.0 $m^2/g$, or 0.1-2 $m^2/g$.

Without being bound to any specific theory, it is presently believed that the fibres used in the present invention should have, when measured according to "Measurement of pH" as described in the "Experimentals" section, a pH value between 7.0-12.0, such as 7.5-11.5. Especially relevant pH-value of the fibres may be 8.0-11.0, such as 8.5-10.5, or 8.5-10.0, or 8.5-9.5, or 9.0-10.5, or 9.0-10.0.

The surface of the fibres may or may not have been modified (surface treated) by chemical or physical processes. Examples of such modification processes used to improve the beneficial effects of the fibres are carbonisation; silylation; surface oxidation; etching such as treatment with alkali metal hydroxide, treatment with hydrofluoric acid; coating; poly electrolytic entrapment in the porous surface structures; adsorption processes; hydrogen-bonding processes; cationic bonding processes; esterification; anionic bonding processes; etc. as well as any modification processes included in the manufacturing of the fibres.

In an interesting embodiment the fibres to be incorporated in the paints are biodegradable under physiological conditions, especially in the respiratory organs (the lungs) of mammals, especially humans. Thus, it is believed that especially interesting fibres are those which are able to biodegrade when present in a modified Gamble's solution as defined in WO 96/14454, page 9. The degree of biodegradability should preferably be at least 20 nm/day, such as at least 30 nm/day, in particular at least 50 nm/day when tested as described in WO 96/14454. Examples of suitable biodegradable fibres are the ones described in WO 96/14454 and WO 96/14274. A specific example thereof is the commercially available MS 603

Roxul 1000, ex. Lapinus Fibres BV (see below). The biodegradability is especially relevant for mineral fibres.

The fibres may, as it will be clear from the description of the manufacturing processes further below, be added together with the remaining paint constituents before milling or the fibres may be added afterwards. It can however be expected that the average length of the fibres will be somewhat reduced during the paint manufacture process (see further below), e.g. due to the applied shear forces and/or milling process. (Milling and intensive stirring is typically performed in order to break up agglomerates of pigments and other particles in the paint composition). It is believed that the paint manufacturing process should preferably be performed so that the fibres in the ready-to-use paint have an average length corresponding to at least 75% of the pre-manufacture average length.

The concentration of the fibres is normally in the range of 0.5-30%, such as 1-25% or 2-30%, e.g. 2-20% or 5-25%, or 3-18%, or 4-12%, preferably 5-10%, by solids volume of the composition.

For the embodiments, wherein the alkyl silicate composition is to be used as such for coating a surface, the content of the inorganic fibres may be somewhat higher, such as 2-50%, e.g. 4-40%, or 5-35% or 2-30%, and preferably 5-25% or 10-30%, by solids volume of the composition.

It should be understood that the above ranges refer to the total amount of fibres, thus, in the case where two or more fibre types are utilised, the combined amounts should fall within the above ranges.

It is presently believed that one very interesting group of fibres is mineral fibres. Particularly preferred examples of such fibres are silicon-containing fibres, rockwool fibres, processed mineral fibres from mineral wool, and volcanic rock fibres.

An average chemical composition of a group of preferred fibres is (only main constituents mentioned as the corresponding oxides): a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w. Up to 5% w/w of other constituents may be present in the inorganic fibres.

Even more preferred fibres have an average chemical composition: a silicium ($SiO_2$) content of 35-45% w/w, a combined calcium (CaO) and magnesium (MgO) content of 30-40% w/w, an aluminium ($Al_2O_3$) content of 15-25% w/w, an iron ($Fe_2O_3$/FeO) content of 0-3% w/w, and a combined potassium ($K_2O$) and sodium ($Na_2O$) content of below 6% w/w. Up to 3% w/w of other constituents may be present in the inorganic fibres.

Examples of commercially available mineral fibres which are believed to improve the mechanical properties according to the invention are (average fibre length in μm; average fibre thickness in μm):
1. Coatforce CF10, ex. Lapinus Fibres BV (The Netherlands), (125; 5.5)
2. MS 603 Roxul 1000, ex. Lapinus Fibres BV (The Netherlands), volcanic rock fibre (125; 5)
3. MS 610 Roxul 1000, ex. Lapinus Fibres BV (The Netherlands), volcanic rock fibre (225; 5.5).

With respect to the relation between the fibres and the alkyl silicate resin, the weight ratio of said fibres to the alkyl silicate resin is typically at least 20:100, such as 20:100-75:100, e.g. 25:100-70:100.

Other Constituents

The paint composition may comprise other paint constituents as will be apparent for the person skilled in the art. Examples of such paint constituents are pigments, fillers, additives (e.g. thickening agents, wetting agents, suspending agents, anti-sag agents, anti-sediment agents, stabilizers, coalescing agents, and thixothropic agents.

The paint composition typically comprises a solvent or solvents. Examples of solvents are alcohols such as water, methanol, ethanol, propanol, isopropanol, butanol, isobutanol and benzyl alcohol; alcohol/water mixtures such as ethanol/water mixtures; aliphatic, cycloaliphatic and aromatic hydrocarbons such as white spirit, cyclohexane, toluene, xylene and naphtha solvent; ketones such as methyl ethyl ketone, acetone, methyl isobutyl ketone, methyl isoamyl ketone, diacetone alcohol and cyclohexanone; ether alcohols such as 1-methoxy-2-propanol, 2-butoxyethanol and butyl diglycol; esters such as methoxypropyl acetate, n-butyl acetate and 2-ethoxyethyl acetate; and mixtures thereof.

Preparation of the Alkyl Silicate Composition

The alkyl silicate composition may be prepared by any suitable technique that is commonly used within the field of paint production.

Zinc-Containing Alkyl Silicate Compositions

As mentioned above, the present invention—in a second main aspect—provides an acidic-stabilised alkyl silicate composition comprising zinc and inorganic fibres, the zinc constituting 50-95% by solids weight of the total composition, and the fibres constituting 1-30% by solids volume of the non-zinc fraction of the composition,
said fibres having
(i) an average length of 25-250 μm and an average thickness of 1-50 μm, and a ratio between the average length and the average thickness (aspect ratio) of at least 5; and
(ii) a specific surface area (BET) of 0.01-6 $m^2/g$.

By the term "non-zinc fraction of the composition" is meant the basis calculated on the weight or volume (whatever applies) of the total composition excluding the zinc.

The specification of the fibres and the constituents of the composition generally follow that concerning the first main aspect of the invention (e.g. with respect to the alkyl silicate resin, the inorganic fibres, etc.).

The zinc to be used is typically in a particulate form, e.g. in the form of zinc powder or zinc dust.

This being said, the concentration of the fibres is normally in the range of 0.5-30%, such as 1-25%, e.g. 2-20%, or 3-18%, or 4-12%, preferably 5-10%, by solids volume of the non-zinc fraction of the composition.

Preparation of the Zinc-Containing Alkyl Silicate Composition

The zinc-containing alkyl silicate composition is typically prepared by mixing the alkyl silicate composition with zinc and any other relevant constituents shortly before use thereof. The constituents are typically prepared on beforehand as two (or more) components (pre-mixtures), which can readily be mixed so as to obtain the ready-to-used composition.

PREFERRED EMBODIMENTS

In a particular embodiment, the invention relates to an acidic-stabilised alkyl silicate composition comprising 6-25% by solids volume of mineral fibres,
said fibres having
(i) an average length of 50-250 μm, an average thickness of 2-20 μm, and a ratio between the average length and the average thickness (aspect ratio) of at least 5;
(ii) a specific surface area (BET) of 0.1-2.0 $m^2/g$; and
(iii) a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w;

the weight ratio of said fibre to the alkyl silicate resin being at least 20:100.

In a further particular embodiment, the present invention provides an acidic-stabilised alkyl silicate composition comprising zinc and inorganic fibres, the zinc constituting 50-95% by solids weight of the total composition, and the fibres constituting 1-30% by solids volume of the non-zinc fraction of the composition, said fibres having (i) an average length of 50-250 µm, an average thickness of 2-20 µm, and a ratio between the average length and the average thickness (aspect ratio) of at least 5;

(ii) a specific surface area (BET) of 0.1-2.0 $m^2$/g; and (iii) a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w;

the weight ratio of said fibre to the alkyl silicate resin being at least 20:100.

In a particular variant of the above-mentioned embodiments, the fibres have a pH of 8.5-10.5.

A Method for the Establishment of a Crack Resistant Alkyl Silicate Paint Coat

The present invention further provides a method for the establishment of a crack resistant alkyl silicate paint coat, said method comprising the step of applying an alkyl silicate composition as defined herein (either the acidic-stabilised alkyl silicate composition or the zinc-containing alkyl silixate composition) to a metal surface, e.g. an iron or steel surface, in particular a steel surface.

Typically, the method comprises:

(i) applying the alkyl silicate composition onto a surface thereby forming a curable film on said surface, and (ii) allowing said curable film to cure thereby forming the alkyl silicate paint coat.

Experimentals

Test Methods

Measurement of Specific Surface Area

The specific surface area is determined based on the conventional BET method.

Measurement of pH

The procedure is adjusted from ISO 787-8:2000: *"General methods of test for pigments and extenders—Part 8: Determination of matter soluble in water—Cold extraction method"*.

1. Place 25±0.01 g of fibre/filler/pigment into a 250 mL beaker. Add 100 mL of deionised water to the beaker and stir at room temperature (25±2° C.) for one hour using a magnetic stirrer.

2. After stirring, let the mixture stand for 15 min and place then the supernatant into a centrifuge tube. Spin for 15 min at 3500 rpm.

3. Take the supernatant out using a pipette and filter with a 50 mL syringe equipped with a 0.45 µm cellulose filter. Place the filtrate in a small beaker (50 mL).

4. Read the pH by using a pH-meter.

Measurement of Gel Time

The gel time indicates the degree of hydrolysis, and the degree of hydrolysis influences the storage stability and the curing time of the liquid. If the gel time is below the accepted limit, the shelf life of the product may be shorter than specified and this is not acceptable.

The gel time is measured on the component 1 liquid (prepared as described in "Preparation of component 1") but without adding the zinc chloride catalyst solution.

The gel time is related to the temperature. The test must take place at a temperature of 25° C. Let the ingredients and the magnetic stirrer condition to 25° C. in a climatic room.

1. Weigh out in the cup the amount of sample to be tested that corresponds to 15 mL by using the specific gravity of the sample.

2. Place the cup with the stirring rod and lid on a magnetic stirrer and start stirring at a speed of approx. 250-400 rpm.

3. Add 2.00 mL of 2.5% w/w aqueous ammonium carbamate solution and start the stop watch. Continue rotation until the liquid gels. Stop the watch.

The liquid may gel slowly; the gel time is then determined as the time when the vortex disappears and a curved surface is formed. The gel time is recorded when I) the regularly swirling of the rod stops or II) when the liquid is stiff though the stirring rod continues to swirl underneath.

Stability Test

The stability test consists of accelerated exposure and measurement of gel time.

The model paints were prepared according to the description in "Preparation of component 1". The model paints were kept in air tight glass containers and placed in a 50° C. oven to speed up any processes causing instability in the container.

The containers were moved from the oven at regular intervals, left in the room for 2 hours for ambient temperature and measurement of the gel time was performed according to the instruction given in "Measurement of gel time"

Mud-Crack Test (MCT) & Accelerator Test (ACT)

Apply a coat on a steel panel, size 200×300 mm, with increasing film thickness with steps of 30-40 µm ranging from specified film thickness of the standard system up to 5 times the specified film thickness. Place the panels at 70-80% RH, 20-25° C. When the coat is completely cured, there must be no visual mud-cracking when looking through a magnifying glass with 10 times magnification.

Pull-Off Test (POT)

Pull-off test according to ISO 4624 (ASTM D 4541), with P.A.T hydraulic adhesion tester. This test covers the determination of the pull-off strength of a coating or coating system, by determining the greatest perpendicular force (in tension) that a surface area can bear, before a plug of material is detached. Failure will occur along the weakest plane within the system comprised of the test fixture, adhesive coating system and substrate. After the panels have been coated and conditioned, a steel pin doll with a surface area of 1.58 $cm^2$ is glued onto the paint surface on the test panel (150×200×15 mm) with Standard Araldite glue, cured for 24 hours. After curing of the glue, the paint film is cut free around the dolls down to the substrate and the dolls are pulled off using the P.A.T hydraulic adhesion tester. The pull-off value (tensile strength) is noted, and converted in relation to the area of the doll and stated in MPa.

Salt Spray Test (SST)

Salt spray test according to ASTM B 117 (ISO 7253). Test for evaluation corrosion resistance in salt spray or reproducing corrosion that occurs in atmosphere containing salt spray or splash. The test involves constant spray with a 5% NaCl solution at 35° C. When the test is stopped, blisters and rust are evaluated according to ASTM D 714 (ISO 4628-2) and ASTM D 610 (ISO 4628-3) respectively. Adhesion is evaluated according to knife adhesion test.

Chemical Resistance Test (CRT)

Chemical resistance test (CRT), partly according to ISO 2812-1974 (method 1), which is a method for determining the resistance of a single-coat film or a multi-coat of paints or related products to the action of liquids.

The panels are exposed to the liquid with inspection after 7 days, 1 month and final evaluation after 2 months. Panels are half immersed in the chemical and subject to storage temperatures of 23° C. After exposure, the panels are dried and both the immersed and non-immersed areas are tested according to ASTM D 4752 as follows:

The method describes a solvent rub technique for assessing the MEK (methyl ethyl ketone) resistance of ethyl silicate (inorganic) zinc-rich primers.

The dry film thickness of the coating in a selected area is measured. The coating is rubbed with MEK 50 times using a cloth. The dry film thickness in the rubbed area is measured after rubbing. The resistance is evaluated on a scale from 5 (no effect on surface after rubbing) to 0 (penetration to the substrate after rubbing). Results from the immersed part are reported as wet resistance and the non-immersed area as dry resistance.

Immersion (IMS)

This test is performed in order to provoke possible weak adhesion in a system, applied on a panel half immersed in fresh water.

The panel is applied and cured before the immersion. Half the panel is immersed in fresh water and half the panel is exposed to the water vapour. No water-stirring and ambient temperature. The exposure period is 14 days. When the test is stopped, the panels are immediately examined for blisters according to ASTM D 714 (ISO 4628-2) and adhesion is evaluated according to knife adhesion test.

Knife Adhesion Test (ADH)

Knife adhesion test is used to evaluate the adhesion of a paint system to the substrate and between coats (layers).

The test is done by making two intersecting scratches through the paint film to the substrate with a sharp steel knife. Adhesive or cohesive failures are evaluated by peeling the coating from the intersection point and outwards.

The test is performed on both immersed and non-immersed panel-halves (referred to as respectively "wet" and "dry" adhesion). The type of rupture is reported, and the severity is judged on a scale from 5 (perfect) to 0 (poor).

Specific Surface by Nitrogen Adsorption (BET)

The specific surface area was measured by independent test institute. Measurements were made on a "Micromeritics Gemini III-2375", surface area analyzer—BET, where the specific surface of a product is measured by liquid nitrogen adsorption. Kaolinite from Micromeritics was used as reference.

Materials

All amounts stated as % by solids volume of the paint should be understood as % by solids volume of the mixed paint composition ready to be applied.

The fibre and filler materials used are described in Table 1 below.

TABLE 1

Identification of the fibres and fillers used in the model paints

| Fibres (trade name & type) | As used in model paint no. | Surface area ($m^2/g$) | Fibre dimension (diameter/length) | $Fe_2O_3$ | FeO | $SiO_2$ | $Al_2O_3$ | CaO | MgO | $K_2O$ | $Na_2O$ | pH measurement* | Supplier |
|---|---|---|---|---|---|---|---|---|---|---|---|---|---|
| Coatforce CF10 volcanic rock fibre | 1, 2, 3 & 4 | 0.24# | 5/125 | | 0-1 | 37-42 | 18-23 | 34-39 | | <3 | | 9.23 | Lapinus Fibres BV (The Netherlands) |
| MS603 Roxul volcanic rock fibre | 5 | 0.2# | 5.5/125 | | 4.5-8 | 38-43 | 18-23 | 23-28 | | <4.5 | | 9.46 | Lapinus Fibres BV (The Netherlands) |

| Filler (trade name & type) | As used in model paint no. | Surface area ($m^2/g$) | Filler appearance | $Fe_2O_3$ | FeO | $SiO_2$ | $Al_2O_3$ | CaO | MgO | $K_2O$ | $Na_2O$ | pH measurement* | Supplier |
|---|---|---|---|---|---|---|---|---|---|---|---|---|---|
| Polywhite E Powder Alumina silicate - China Clay | 6 | >6.6 | powder | 1 | | 45-50 | 35-40 | | | 1 | | 5.87 | Imery minerals ltd. (UK) |
| Silica Stiff 100/0 Silicate micro spheres | 7 | 0.16 | powder | 6 | | 55-65 | 24-40 | | | | | 7.22 | Schwarzwalder Textil-Werke (Germany) |
| Luzenac ST-30 Magnesium hydro silicate, talc | 8 | 6.95 | powder | | 1.5 | 46 | 12.5 | 0.5 | 31 | | | 8.37 | Luzenac (Austria) |
| Plastorit 0000 Aluminium silicate, mica | 9 | 3.8 | powder | | 3.5 | 51 | 23 | | 12 | 3 | | 8.58 | Luzenac (Austria) |
| Nytal 3300 Magnesium silicate, talc | 10 | 18.3 | powder | 1.1 | | 61 | 0.9 | 0.14 | 31 | | | 9.26 | R. T. Vanderbilt Co. Ltd. (USA) |
| Alnasil P 95 amorphous silica | 11 | 55 | powder | <0.05 | | 80-85 | 9-10 | | | | 7-9 | 10.02 | IQE (Spain) |
| Minex S 20 Aluminium/potassium/sodium silicate, feldspar | 12 | 2.8 | powder | 0.1 | | 57 | 24 | 1.1 | | 9 | 8 | 10.33 | North Cape Nefelin (Norway) |

*pH measurement according to "Measurement of pH" as described herein;
Values stated on datasheet.

HEMPEL'S GALVOSIL 15700-19840 is a two-component, solvent-borne, moisture-curing, inorganic zinc silicate paint with outstanding resistance against weathering and abrasion. It has excellent chemical resistance within the pH range 6-9 and offers cathodic protection of local mechanical damage. Recommended use: As a general purpose, heavy-duty, rust-preventing primer for long-term protection of steel exposed to moderately to severely corrosive environment.

HEMPEL'S GALVOSIL 15700-19840 consists of HEMPEL'S GALVOSIL LIQUID BASE 15709-19840 and HEMPEL'S ZINC METAL PIGMENT 97170 which is a zinc metal pigment to be mixed with HEMPEL'S GALVOSIL LIQUID BASE 15709-19840.

HEMPADUR MASTIC 45880-50630 is an anticorrosive epoxy paint from Hempel A/S that may be specified on top of cured zinc silicate primers. HEMPADUR MASTIC 45880-50630 is a two-component polyamide adduct cured, high solids, high build epoxy paint. It forms a hard and tough coating, has good wetting properties and low temperature curing. Recommended use: As an intermediate or finishing coat in heavy duty paint systems where low VOC and high film build are required.

HEMPATHANE TOPCOAT 55910-11150 is a two-component polyurethane topcoat, cured with aliphatic isocyanate. Recommended use: As a VOC-compliant, high-build finishing coat for protection of structural steel in corrosive environment, especially for maintenance purposes.

Composition of the Model Paints

TABLE 2

Composition template of the model paints for component 1

| Component 1: | Weight |
|---|---|
| Pre-hydrolysed Ethyl silicate | 92.1 |
| ethyl silicate | 49.9 |
| Silbond 40, ex. Silbond Corporation - USA | |
| 1-methoxy-2-propanol* | 25.7 |
| Isopropyl alcohol* | 11.6 |
| Hydrochloric acid, 1 w/w % solution* | 4.9 |
| Additives | 12.8 |
| Thickening agents, wetting and suspending agents, anti-sag and anti-sediment agents etc. | 7.6 |

TABLE 2-continued

Composition template of the model paints for component 1

| | |
|---|---|
| zinc chloride accelerator solution, 25 w/w % solution in isopropyl alcohol | 5.2 |
| Zinc Chloride HMP, ex. Floridienne Chimie S.A. - Belgium | |

| Fibres/fillers | Type and amount as indicated in table 3 |
|---|---|
| Solvents | 65.4 |
| Xylene* | 26.2 |
| 1-methoxy 2-propanol* | 27.7 |
| C9 alkylbenzenes* | 11.5 |
| Component 2: | |
| HEMPEL'S ZINC METAL PIGMENT 97170 | 392.4 |

*Hydrochloric acid solution and solvents from local raw material suppliers

Preparation of Component 1

Component 1 was prepared in the following way:

Pre-Hydrolysed Ethyl Silicate:

Ethyl-silicate, 1-methoxy-2-propanol, and isopropyl alcohol was mixed in a suitable can and the hydrochloric acid solution was added slowly under agitation for 1 hour.

The intermediate base (xylene, pre-hydrolysed ethyl silicate, and additives) was pre-mixed on a Diaf dissolver equipped with an impeller disc (70 mm in diameter) in a 1 L can for 15 min at 1000 rpm. Fibre/filler (type and amounts as indicated in table 3) was added to the mixture and grinding was performed for 5 min at 2000 rpm.

The remaining 1-methoxy-2-propanol and the C9 alkylbenzenes were added and the composition was mixed at 1000 rpm for 15 min. The zinc chloride catalyst solution was added and the composition was mixed for 5 min at 1000 rpm.

The stability test was performed on model paints 4-12 and only on component 1 of the model paint (before mixing component 1 and component 2)

The remaining tests were performed on model paints 1-4 and commercial standard paint systems and on the mixed product of component 1 and component 2 of the model paints:

Just before application, HEMPELS ZINC METAL PIGMENT 97170 (component 2) was added to component 1. HEMPEL'S ZINC METAL PIGMENT 97170 was slowly poured down into component 1 with constant mechanical stirring until the mixture was free of lumps.

TABLE 3

Model paints used in examples

| Model paint no. | Fibre component 1 | Amount of fibre component 1 (grams) | Additional amount of China Clay filler (grams) | Fibre amount in VS % dry paint (component 1 and 2e) | Fibre:silicate binder ratio (weight) |
|---|---|---|---|---|---|
| 1 | Coatforce CF10 | 14.5 | 31.1 | 6.5 | 29:100 |
| 2 | Coatforce CF10 | 28.9 | 17.2 | 13.1 | 58:100 |
| 3 | Coatforce CF10 | 43.4 | 3.2 | 19.6 | 87:100 |
| 4 | Coatforce CF10 | 20.4 | 49.7 | 8.0 | 41:100 |
| 5 | MS603 Roxul | 20.8 | 49.7 | not relevant | 42:100 |

TABLE 3-continued

Model paints used in examples

| Model paint no. (comp. ex.) | Filler component 1 | Amount of filler component 1 (grams) | Additional amount of China Clay filler (grams) | Fibre amount in VS % dry paint (component 1 and 2) | Fibre:silicate binder ratio (weight) |
|---|---|---|---|---|---|
| 6 | Alumina silicate - China Clay | 54.9 | 0 | not relevant | not relevant |
| 7 | Silicate micro spheres | 14.8 | 0 | not relevant | not relevant |
| 8 | Magnesium hydro silicate, talc | 57.1 | 0 | not relevant | not relevant |
| 9 | Aluminium silicate, mica | 58.1 | 0 | not relevant | not relevant |
| 10 | Magnesium silicate, talc | 58.1 | 0 | not relevant | not relevant |
| 11 | Amorphous silica | 44.4 | 0 | not relevant | not relevant |
| 12 | Aluminium/potassium/sodium silicate, feldspar | 54.1 | 0 | not relevant | not relevant |

Preparation of Test Panels

Where not specifically stated elsewhere, the test panels used were coated according to the procedure stated below.

Steel panels were coated with 60-120 μm dry film thickness (specific dry film thickness stated in the result schemes) of the paint to be tested by airless spraying with a recoat interval of 24 hours between each coat if more than one layer is applied. The steel panels used are all cold rolled mild steel, abrasive blasted to Sa 3 (ISO 8501-1), with a surface profile equivalent to BN 10 (Rugotest No. 3). After the panels have been coated they are conditioned at a temperature of 20-25° C. and 70-80% relative humidity for a period of 7 days if not otherwise stated.

Results

Remarks to results: The stability test shows the correlation between the pH of the filler or fibre used and the stability of the system: The higher pH, the higher the tendency towards instability of the system. Surprisingly, the fibres provide systems with high stability, despite the relatively high pH.

TABLE 5

Mud-crack test (MCT) - results

| System | Relative minimum DFT where mud-crack appears (standard system HEMPEL'S GALVOSIL 15700-19840 normalised to 100) |
|---|---|
| HEMPEL'S GALVOSIL 15700-19840 | 100 |

TABLE 4

Stability test (Gel time) - results

| Model paint no. | Fibre component 1 | Surface area ($m^2/g$) | Fibre pH* | Days of exposure at 50° C. | | | | | | |
|---|---|---|---|---|---|---|---|---|---|---|
| | | | | 0 | 3 | 7 | 9 | 13 | 16 | 20 |
| 4 | Coatforce CF10 | 0.2# | 9.23 | 171 | 165 | 160 | 153 | 144 | 128 | 109 |
| 5 | MS603 Roxul | 0.24# | 9.46 | 174 | 162 | 165 | 163 | 176 | 147 | 142 |

| Model paint no. (comparative example) | Filler component 1 | Surface area ($m^2/g$) | Fibre pH* | Days of exposure | | | | | | |
|---|---|---|---|---|---|---|---|---|---|---|
| | | | | 0 | 3 | 7 | 9 | 13 | 16 | 20 |
| 6 | Alumina silicate - China Clay | >6.6 | 5.87 | 176 | 170 | 164 | 165 | 146 | 153 | 113 |
| 7 | Silicate micro spheres | 0.16 | 7.22 | 126 | 128 | 132 | 133 | 123 | 123 | 110 |
| 8 | Magnesium hydro silicate, talc | 6.95 | 8.37 | 107 | 139 | 138 | 135 | 123 | 120 | 99 |
| 9 | Aluminium silicate, mica | 3.8 | 8.58 | 131 | 137 | 137 | 130 | 127 | 116 | 93 |
| 10 | Magnesium silicate, talc | 18.3 | 9.26 | 139 | 136 | 135 | 134 | 115 | 98 | 51 |
| 11 | Amorphous silica | 55 | 10.02 | Gel | | | | | | |
| 12 | Aluminium/potassium/sodium silicate, feldspar | 2.8 | 10.33 | 123 | 10 | Gel | | | | |

*pH measurement according to "Measurement of pH" as described herein;
Values stated on datasheet.

TABLE 5-continued

Mud-crack test (MCT) - results

| System | Relative minimum DFT where mud-crack appears (standard system HEMPEL'S GALVOSIL 15700-19840 normalised to 100) |
|---|---|
| Model paint 1 | 142 |
| Model paint 2 | >167 |
| Model paint 3 | >200 |

Remarks to results: The Minimum DFT where mud-crack appears is significantly increased in the model paints compared to the standard paint. The resistance towards mud-cracking is therefore significantly improved

TABLE 6

Accelerator test (ACT) - results

| System | Curing time 23° C./75% RH (hours) | Relative minimum DFT where mud-crack appears (Model paint 6 system with 0.50 g $ZnCl_2$ accelerator/100 mL of mixed paint normalised to 100) |
|---|---|---|
| Model paint 6A (without accelerator) | >24 | 121 |
| Model paint 6B (with 0.25 g $ZnCl_2$/100 mL of the mixed paint) | 24 | 116 |
| Model paint 6 (with 0.50 g $ZnCl_2$/100 mL of the mixed paint) | ~10 | 100 |
| Model paint 6C (with 0.75 g $ZnCl_2$/100 mL of the mixed paint) | ~7 | 79 |
| Model paint 6D (with 1.00 g $ZnCl_2$/100 mL of the mixed paint) | 5½ | 74 |
| Model paint 4 (with fibres and 0.50 g $ZnCl_2$/100 mL of the mixed paint) | ~10 | 179 |

Remarks to results: The Minimum DFT where mud-crack appears is significantly decreased as the amount of accelerator in the model paint is increased. However, this can be countered by incorporation of fibres.

TABLE 7

Salt Spray Test after 1000 hours - results

| System (first coat/second coat/third coat) | Recoating interval | DFT (mean) | Blistering | Rust | Adhesion |
|---|---|---|---|---|---|
| HEMPEL'S GALVOSIL 15700-19840 | — | 76 | 10 | — | 5 |
| Model paint 4 | — | 78 | 10 | — | 5 |
| HEMPEL'S GALVOSIL 15700-19840/ HEMPADUR MASTIC 45880-50630/ HEMPATHANE TOPCOAT 55910-11150 | 1 d/1 d | 355 | 10 | 10 | 5 |
| HEMPEL'S GALVOSIL 15700-19840/ HEMPADUR MASTIC 45880-50630/ HEMPATHANE TOPCOAT 55910-11150 | 7 d/1 d | 304 | 10 | 10 | 5 |
| Model paint 4/ HEMPADUR MASTIC 45880-50630/ HEMPATHANE TOPCOAT 55910-11150 | 1 d/1 d | 346 | 10 | 10 | 5 |
| Model paint 4/ HEMPADUR MASTIC 45880-50630/ HEMPATHANE TOPCOAT 55910-11150 | 7 d/1 d | 299 | 10 | 10 | 5 |

Remarks to results: No rust or blistering were seen on the three coat systems and the adhesion was perfect which indicates that the performance of the model paint systems are acceptable and on level with the superior performance of the standard systems.

TABLE 8

Knife adhesion Test (ADH) - results

| System (first coat/second coat/third coat) | Re-coating interval | DFT (mean) | Blistering | Relative knife adhesion (dry/wet) (standard system normalised to 100) |
|---|---|---|---|---|
| HEMPEL'S GALVOSIL 15700-19840/HEMPADUR MASTIC 45880-50630/HEMPATHANE TOPCOAT 55910-11150 | 1 d/1 d | 355 | 10 | 100/100 |
| HEMPEL'S GALVOSIL 15700-19840/HEMPADUR MASTIC 45880-50630/HEMPATHANE TOPCOAT 55910-11150 | 7 d/1 d | 307 | 10 | 100/100 |
| Model paint 4/HEMPADUR MASTIC 45880-50630/HEMPATHANE TOPCOAT 55910-11150 | 1 d/1 d | 348 | 10 | 100/100 |
| Model paint 4/HEMPADUR MASTIC 45880-50630/HEMPATHANE TOPCOAT 55910-11150 | 7 d/1 d | 293 | 10 | 100/100 |

Remarks to results: No adhesion problems were seen on the three coat systems and the adhesion was approved which indicates that the performance of the model paint systems are acceptable and on level with the superior performance of the standard systems.

TABLE 9

Pull-Off Test (POT) - results

| System (first coat/second coat/third coat) | Re-coating interval | DFT (mean) | Relative Pull-Off Value (standard systems normalised to 100) |
|---|---|---|---|
| HEMPEL'S GALVOSIL 15700-19840/HEMPADUR MASTIC 45880-50630/HEMPATHANE TOPCOAT 55910-11150 | 1 d/1 d | 357 | 100 |
| HEMPEL'S GALVOSIL 15700-19840/HEMPADUR MASTIC 45880-50630/HEMPATHANE TOPCOAT 55910-11150 | 7 d/1 d | 312 | 100 |
| Model paint 4/HEMPADUR MASTIC 45880-50630/HEMPATHANE TOPCOAT 55910-11150 | 1 d/1 d | 399 | 96 |
| Model paint 4/HEMPADUR MASTIC 45880-50630/HEMPATHANE TOPCOAT 55910-11150 | 7 d/1 d | 307 | 95 |

Remarks to results: No pull-off problems were seen on the three coat systems and the adhesion was approved which indicates that the performance of the model paint systems are acceptable and on level with the superior performance of the standard systems.

TABLE 10

Chemical Resistance Test (CRT) - results

| System | DFT | Chemical | Family name | Evaluation (MEK) Dry(Wet) |
|---|---|---|---|---|
| GALVOSIL 15700-19840 | 74 | Dichloromethane | Halogenated hydrocarbons | 5(5) |
| Model paint 4 | 70 | | | 5(5) |
| GALVOSIL 15700-19840 | 67 | Methanol | Mono alcohols | 5(5) |
| Model paint 4 | 78 | | | 5(5) |
| GALVOSIL 15700-19840 | 74 | Phenol | Phenolic chemicals | 5(5) |
| Model paint 4 | 74 | | | 5(5) |
| GALVOSIL 15700-19840 | 67 | 1-Methoxy-2-propanol | Ethers and ether alcohols | 5(5) |
| Model paint 4 | 69 | | | 5(5) |
| GALVOSIL 15700-19840 | 79 | Ethyl acetate | Esters of monoacids | 5(5) |
| Model paint 4 | 75 | | | 5(5) |
| GALVOSIL 15700-19840 | 74 | Acetone | Ketones | 5(5) |
| Model paint 4 | 72 | | | 5(5) |
| GALVOSIL 15700-19840 | 68 | Aniline | Amines | 5(5) |
| Model paint 4 | 80 | | | 5(5) |
| GALVOSIL 15700-19840 | 76 | Diethanol amine | Alcohol amines | 5(5) |

TABLE 10-continued

Chemical Resistance Test (CRT) - results

| System | DFT | Chemical | Family name | Evaluation (MEK) Dry(Wet) |
|---|---|---|---|---|
| Model paint 4 | 74 | | | 5(5) |
| GALVOSIL 15700-19840 | 71 | Oleic acid | Organic acids and anhydrides | 5(5) |
| Model paint 4 | 65 | | | 5(5) |

Remarks to results: No problems with resistance to chemicals were seen on the tested panels which indicates that the performances of the model paint systems are acceptable and on level with the superior performance of the standard systems.

The invention claimed is:

1. An acidic-stabilised alkyl silicate composition comprising 0.5-30% by solids volume of inorganic fibres,
    said fibres having
        (i) an average length of 25-250 μm and an average thickness of 1-50 μm, and a ratio between the average length and the average thickness (aspect ratio) of at least 5; and
        (ii) a specific surface area (BET) of 0.01-6 $m^2/g$.

2. The composition according to claim 1, wherein the fibres are mineral fibres.

3. The composition according to claim 1, wherein the fibres have a pH of 8.0-11.0.

4. The composition according to claim 1, wherein the fibres have a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w.

5. The composition according to claim 1, wherein the fibres have a specific surface area (BET) of 0.05-4.0 $m^2/g$.

6. The composition according to claim 1, which comprises 2-30% by solids volume of the fibres.

7. The composition according to claim 1, wherein the degree of pre-hydrolysis of the alkyl silicate resin is more than 50%.

8. The composition according to claim 1, wherein the fibres have an average length of 50-250 μm, an average thickness of 2-20 μm, and a ratio between the average length and the average thickness (aspect ratio) of at least 5.

9. The composition according to claim 1, wherein the weight ratio of said fibres to the alkyl silicate resin is at least 20:100.

10. The composition according to claim 1 which comprises 1-25% by solids volume of mineral fibres,
    said fibres having
        (i) an average length of 50-250 μm, an average thickness of 2-20 μm, and a ratio between the average length and the average thickness (aspect ratio) of at least 5;
        (ii) a specific surface area (BET) of 0.05-4.0 $m^2/g$;
        (iii) a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w;
    the weight ratio of said fibre to the alkyl silicate resin being at least 20:100.

11. The composition according to claim 10, wherein the fibres have a pH of 8.5-10.5.

12. An acidic-stabilised alkyl silicate composition comprising zinc and inorganic fibres, the zinc constituting 50-95% by solids weight of the total composition, and the fibres constituting 0.5-30% by solids volume of the non-zinc fraction of the composition,
    said fibres having
        (i) an average length of 25-250 μm and an average thickness of 1-50 μm, and a ratio between the average length and the average thickness (aspect ratio) of at least 5; and
        (ii) a specific surface area (BET) of 0.01-6 $m^2/g$.

13. The composition according to claim 12 which comprises 2-20% by solids volume of the non-zinc fraction of the composition of the fibres.

14. The composition according to claim 12, wherein said fibres having
    (i) an average length of 50-250 μm, an average thickness of 2-20 μm, and a ratio between the average length and the average thickness (aspect ratio) of at least 5;
    (ii) a specific surface area (BET) of 0.05-4.0 $m^2/g$; and
    (iii) a silicium ($SiO_2$) content of 30-60% w/w, a combined calcium (CaO) and magnesium (MgO) content of 20-50% w/w, an aluminium ($Al_2O_3$) content of 0.1-30% w/w, an iron ($Fe_2O_3$/FeO) content of up to 10% w/w, and a combined potassium ($K_2O$) and sodium ($Na_2O$) content of below 8% w/w;
the weight ratio of said fibre to the alkyl silicate resin being at least 20:100.

15. A method for the establishment of a crack resistant alkyl silicate paint coat, said method comprising the step of applying a composition as defined in claim 1 to a metal surface.

16. A method for the establishment of a crack resistant alkyl silicate paint coat, said method comprising the step of applying a composition as defined in claim 12 to a metal surface.

* * * * *

UNITED STATES PATENT AND TRADEMARK OFFICE
CERTIFICATE OF CORRECTION

PATENT NO.      : 8,460,454 B2
APPLICATION NO. : 12/747168
DATED           : June 11, 2013
INVENTOR(S)     : Fiedler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Eighth Day of September, 2015

Michelle K. Lee
*Director of the United States Patent and Trademark Office*